United States Patent
Oh

(10) Patent No.: US 12,194,789 B2
(45) Date of Patent: Jan. 14, 2025

(54) VEHICLE SYSTEM AND METHOD FOR DETERMINING A LOCATION OF TIRE PRESSURE MONITORING SENSOR

(71) Applicants: Hyundai Motor Company, Seoul (KR); Kia Corporation, Seoul (KR)

(72) Inventor: Jung Hoon Oh, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 159 days.

(21) Appl. No.: 18/077,287

(22) Filed: Dec. 8, 2022

(65) Prior Publication Data

US 2023/0382166 A1    Nov. 30, 2023

(30) Foreign Application Priority Data

May 30, 2022  (KR) ........................ 10-2022-0066196

(51) Int. Cl.
*B60C 23/04*    (2006.01)

(52) U.S. Cl.
CPC ...... *B60C 23/0416* (2013.01); *B60C 23/0488* (2013.01)

(58) Field of Classification Search
CPC ........................ B60C 23/0416; B60C 23/0488
See application file for complete search history.

(56) References Cited

U.S. PATENT DOCUMENTS

| | | | | |
|---|---|---|---|---|
| 8,498,759 | B1* | 7/2013 | Juzswik | B60C 23/0488 701/10 |
| 2006/0012469 | A1* | 1/2006 | Hirai | B60C 23/061 340/572.1 |
| 2007/0229240 | A1* | 10/2007 | Yasuda | B60G 17/01933 340/442 |
| 2008/0106394 | A1* | 5/2008 | Huang | B60C 23/0408 340/445 |
| 2009/0096599 | A1* | 4/2009 | Kranz | G08G 1/02 340/459 |
| 2015/0057873 | A1* | 2/2015 | Lammers | B60C 23/0481 701/29.7 |
| 2016/0114636 | A1* | 4/2016 | Terada | B60C 23/0416 73/146.5 |
| 2016/0214444 | A1* | 7/2016 | Taki | B60C 23/0433 |

* cited by examiner

*Primary Examiner* — Thomas D Alunkal
(74) *Attorney, Agent, or Firm* — Fox Rothschild LLP

(57) ABSTRACT

The present disclosure relates to a vehicle system and a method for determining a location of a tire pressure sensor. An exemplary embodiment of the present disclosure provides a vehicle system including: a plurality of tire pressure sensors configured to sense air pressure of a tire of a vehicle including a double wheel; a plurality of wheel speed sensors configured to sense a speed of each wheel of the vehicle; and a tire pressure sensor location determining apparatus configured to determine locations of the tire pressure sensors using wheel pulse counter values inputted from the wheel speed sensors whenever the tire pressure sensors transmit tire pressure detection signals.

17 Claims, 13 Drawing Sheets

VEHICLE SYSTEM AND METHOD FOR DETERMINING A LOCATION OF TIRE PRESSURE MONITORING SENSOR

CROSS-REFERENCE TO RELATED APPLICATION

This application claims under 35 U.S.C. § 119(a) the benefit of and priority to Korean Patent Application No. 10-2022-0066196, filed in the Korean Intellectual Property Office on May 30, 2022, the entire contents of which are incorporated herein by reference.

BACKGROUND OF THE DISCLOSURE

(a) Field of the Disclosure

The present disclosure relates to a vehicle system and a method for determining a location of a tire pressure sensor, and more particularly, to a technique for determining a location of a tire pressure sensor of a double-wheeled vehicle.

(b) Description of the Related Art

A tire pressure monitoring system (TPMS), which is a device that measures current tire condition information (pressure, temperature, etc.) through a tire pressure sensor mounted on a tire of the vehicle and informs a driver of it, includes a tire pressure sensor that is directly mounted on the tire and a TPMS monitoring device mounted on a dashboard of the vehicle to display tire information to the driver. That is, the TPMS is a system that helps prevent a risk of accidents in advance by enabling a driver to immediately identify a dangerous condition of the tire (low pressure, high pressure, pressure leakage, etc.) when there is a problem with the tire of the vehicle.

In the case of a single-wheeled passenger vehicle, a location of each sensor may be distinguished by using a tire pressure sensor signal and vehicle information. However, there is a problem in that it is difficult to determine locations of left and right and inner and outer rings of each sensor because a total of 4 sensors are installed on rear wheels in a vehicle in which the rear wheels are configured as double wheels (2 wheels and tires mounted) like a commercial vehicle.

The TPMS may be divided into a low-line type of TPMS warning that a tire pressure is low and a high Line of type TPMS specifically warning which tire pressure is low through a low pressure warning light and a tire location warning light when the tire pressure is low.

However, It is difficult to distinguish between inner and outer wheels when a low pressure of a double-wheeled tire occurs, and thus even when a high-line type of tire pressure sensor is mounted, there is a problem that an air pressure condition of an individual tire cannot be checked.

The above information disclosed in this Background section is only for enhancement of understanding of the background of the disclosure, and therefore, it may contain information that does not form the prior art that is already known in this country to a person of ordinary skill in the art.

SUMMARY OF THE DISCLOSURE

An exemplary embodiment of the present disclosure has been made in an effort to provide a vehicle system and a method for determining a location of a tire pressure sensor, capable of accurately indicating a location of the double-wheeled tire at which a low pressure of a double-wheeled tire occurs by mounting a tire pressure sensor on each of inner and outer wheels of a double-wheeled tire in a vehicle including two wheels, distinguishing left and right wheels using a mounting location of the tire pressure sensor and a wheel pulse counter signal, and accurately determining whether the location of the tire pressure sensor is in the inner or outer wheel, using a sensor rotational acceleration value depending on rotation of the wheels.

The technical objects of the present disclosure are not limited to the objects mentioned above, and other technical objects not explicitly mentioned may be clearly understood by those skilled in the art from the description of the application and in view of the claims.

An exemplary embodiment of the present disclosure provides a vehicle system including: a plurality of tire pressure sensors, each tire pressure sensor being configured to sense air pressure of a tire for use with a vehicle, the vehicle comprising a double wheel; a plurality of wheel speed sensors, each wheel speed sensor being configured to sense a speed of a corresponding wheel of a vehicle; and a tire pressure sensor location determining apparatus configured to determine respective locations of the tire pressure sensors on the basis of wheel pulse counter values. In various embodiments, the wheel pulse counter values may be inputted from the wheel speed sensors whenever the tire pressure sensors transmit tire pressure detection signals.

In an exemplary embodiment of the present disclosure, the tire pressure sensor location determining apparatus further comprises: a communication device configured to receive a wheel pulse counter value from the wheel speed sensor whenever a tire pressure detection signal is received from a tire pressure sensor mounted in a double-wheeled tire; a storage configured to store the tire pressure detection signal and the wheel pulse counter value; and a processor configured to: (1) determine whether each of the tire pressure sensors is mounted in a left wheel or a right wheel by using the wheel pulse counter value, and to (2) determine whether each of the tire pressure sensors is mounted in an inner wheel or an outer wheel by using rotational acceleration.

In an exemplary embodiment of the present disclosure, the wheel pulse counter value may be obtained by converting a wheel pulse signal that is outputted as a number of cogs of a tone wheel into a CAN signal.

In an exemplary embodiment of the present disclosure, the plurality of tire pressure sensors may include a first tire pressure sensor and a second tire pressure sensor mounted in inner and outer wheels of a double rear left wheel, respectively; a third tire pressure sensor and a fourth tire pressure sensor mounted in inner and outer wheels of a double rear right wheel, respectively; and a fifth tire pressure sensor and a sixth tire pressure sensor mounted in opposite front wheels.

In an exemplary embodiment of the present disclosure, each of the tire pressure sensors may be configured to transmit a respective tire pressure detection signal when a corresponding vehicle wheel reaches a predetermined position during rotation.

In an exemplary embodiment of the present disclosure, the first tire pressure sensor and the second tire pressure sensor may be configured to be mounted on respective tires at positions having a predetermined phase difference.

In an exemplary embodiment of the present disclosure, the processor may be further configured to compare a wheel pulse counter value for the first tire pressure sensor with a wheel pulse counter value for the second tire pressure sensor depending on a phase difference between the first tire pressure sensor and the second tire pressure sensor.

In an exemplary embodiment of the present disclosure, the processor may be further configured to determine the first tire pressure sensor and the second tire pressure sensor as a pair of tire pressure sensors respectively mounted in an inner wheel and an outer wheel of one double wheel when the difference is constant.

In an exemplary embodiment of the present disclosure, the processor may be further configured to determine that the first tire pressure sensor and the second tire pressure sensor are mounted in wheels having a constantly increasing value among wheel pulse counter values inputted from wheel speed sensors of each corresponding wheel whenever the first tire pressure sensor and the second tire pressure sensor each transmit, respectively, a tire pressure detection signal.

In an exemplary embodiment of the present disclosure, the processor may be further configured to determine whether the first tire pressure sensor is provided in an outer wheel or an inner wheel depending on an increasing or decreasing direction of rotational acceleration of each of the sensors by using rotational acceleration signals received from the first tire pressure sensor and the second tire pressure sensor.

In an exemplary embodiment of the present disclosure, the first tire pressure sensor and the second tire pressure sensor may be respectively mounted in opposite directions.

In an exemplary embodiment of the present disclosure, when a vehicle wheel rotates, the rotational acceleration may increase in a (+) direction when the first tire pressure sensor rotates clockwise, and the rotational acceleration may increase in a (−) direction when the second tire pressure sensor rotates counterclockwise.

In an exemplary embodiment of the present disclosure, the processor may be further configured to determine that a tire pressure sensor whose rotational acceleration increases in the (+) direction is positioned in the inner wheel and a tire pressure sensor whose rotational acceleration increases in the (−) direction is positioned in the outer wheel is among a pair of tire pressure sensors determined to be positioned in the left wheel of the vehicle.

In an exemplary embodiment of the present disclosure, the processor may be further configured to determine (1) that a tire pressure sensor whose rotational acceleration increases in the (+) direction is positioned in the outer wheel and (2) a tire pressure sensor whose rotational acceleration increases in the (−) direction is positioned in the inner wheel is among a pair of tire pressure sensors determined to be positioned in the right wheel of the vehicle.

An exemplary embodiment of the present disclosure provides a tire pressure sensor location determining method including: receiving and storing, by a processor, signals from a plurality of tire pressure sensors and a plurality of wheel speed sensors; and determining, by the processor, respective locations of the tire pressure sensors using wheel pulse counter values inputted from the wheel speed sensors whenever the tire pressure sensors transmit tire pressure detection signals.

In an exemplary embodiment of the present disclosure, the determining of the respective locations of the tire pressure sensors step may further include: determining, by the processor, whether each of the tire pressure sensors is mounted in a left wheel or a right wheel using the wheel pulse counter values; and determining whether each of the tire pressure sensors is mounted in an inner wheel or an outer wheel using rotational acceleration values.

In an exemplary embodiment of the present disclosure, the determining of whether each of the tire pressure sensors is mounted in the inner wheel or the outer wheel may further include: comparing, by the processor, wheel pulse counter values of each of the tire pressure sensors with each other; and determining, by the processor, whether two tire pressure sensors among the plurality of tire pressure sensors have a constant difference value as a result of the comparison of the wheel pulse counter values step, thereby determining a pair of adjacent sensors of the plurality of tire pressure sensors are located on an inner wheel and an outer wheel of one double wheel.

In an exemplary embodiment of the present disclosure, the determining of whether each of the tire pressure sensors is mounted in the inner wheel or the outer wheel may step may further include determining, by the processor, that the tire pressure sensors determined as the pair are positioned in a wheel corresponding to a wheel pulse counter value having a constant increasing value among wheel pulse counter values inputted from the wheel speed sensor of each wheel whenever the pair of tire pressure sensors transmit tire pressure detection signals.

In an exemplary embodiment of the present disclosure, the determining of whether each of the tire pressure sensors is mounted in the inner wheel or the outer wheel step may further include determining, by the processor, whether each of the tire pressure sensors is mounted in an inner wheel or an outer wheel depending on an increasing or decreasing direction of rotational acceleration of each of the tire pressure sensors by using a rotational acceleration signal received from each of the tire pressure sensors.

In an exemplary embodiment of the present disclosure, the determining of whether each of the tire pressure sensors is mounted in the inner wheel or the outer wheel step may further include: determining, by the processor, that a tire pressure sensor whose rotational acceleration increases in the (+) direction is positioned in the inner wheel and a tire pressure sensor whose rotational acceleration increases in the (−) direction is positioned in the outer wheel, among a pair of tire pressure sensors determined to be positioned in the left wheel of a vehicle; and determining, by the processor, that a tire pressure sensor whose rotational acceleration increases in the (+) direction is positioned in the outer wheel and a tire pressure sensor whose rotational acceleration increases in the (−) direction is positioned in the inner wheel are among a pair of tire pressure sensors determined to be positioned in the right wheel of the vehicle.

According to the present technique, it is possible to accurately indicate a location of the double-wheeled tire at which a low pressure of a double-wheeled tire occurs by mounting a tire pressure sensor on each of inner and outer wheels of a double-wheeled tire in a vehicle including two wheels, distinguishing left and right wheels using a mounting location of the tire pressure sensor and a wheel pulse counter signal, and accurately determining whether the location of the tire pressure sensor is in the inner or outer wheel, using a sensor rotational acceleration value depending on rotation of the wheels.

Furthermore, various effects that can be directly or indirectly identified through this document may be provided.

DETAILED DESCRIPTION OF THE EMBODIMENTS

Figure 1:
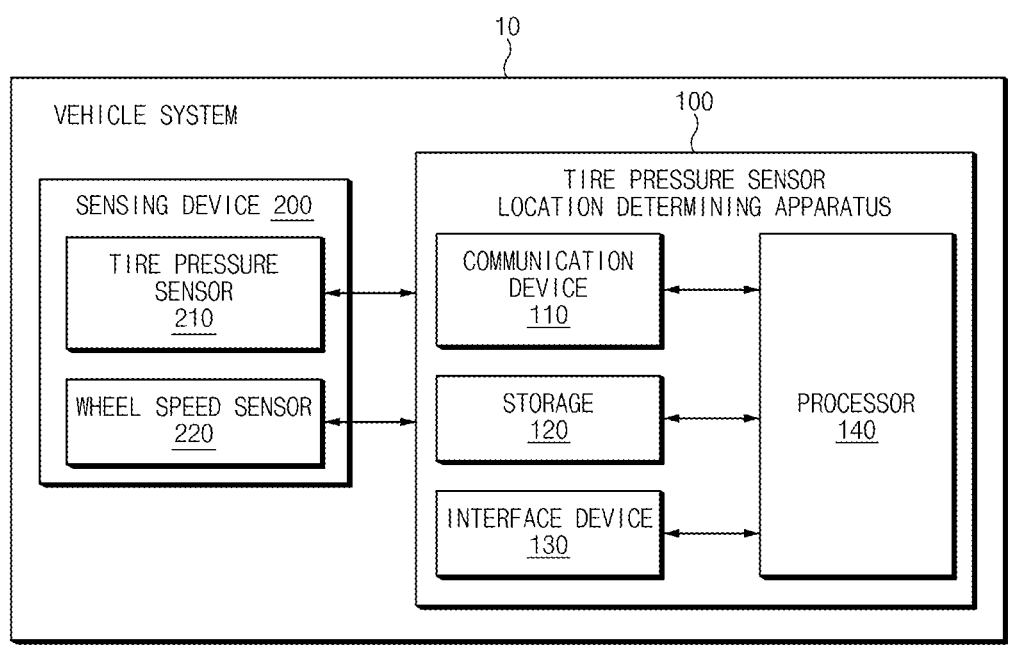
FIG. 1 illustrates a block diagram showing a configuration of a vehicle system including a tire pressure sensor location determining apparatus according to an exemplary embodiment of the present disclosure.

Hereinafter, exemplary embodiments of the present disclosure will be described in detail with reference to the accompanying drawings. It should be noted that in adding reference numerals to constituent elements of each drawing, the same constituent elements have the same reference numerals to the extent possible. Furthermore, in describing exemplary embodiments of the present disclosure, when unnecessary detailed descriptions of related well-known configurations or functions interfere with understanding of the exemplary embodiments of the present disclosure, the well-known descriptions thereof will be omitted for the sake of brevity and ease of understanding.

In describing constituent elements according to an exemplary embodiment of the present disclosure, terms such as first, second, A, B, (a), and (b) may be used. These terms are only for distinguishing the constituent elements from other constituent elements, and the nature, sequences, or orders of the constituent elements are not limited by the terms. Furthermore, all terms used herein including technical scientific terms shall have the same meaning as would be generally understood by those skilled in the technical field to which an exemplary embodiment of the present disclosure pertains (those skilled in the art) unless the context clearly indicates otherwise. Terms and phrases defined in a general purpose dictionary shall be construed to have meanings matching those in the context of a related art, and shall not be construed to have idealized or excessively formal meanings unless they are clearly defined in the present specification.

Hereinafter, various exemplary embodiments of the present disclosure will be described in detail with reference to FIG. 1 through FIG. 13.

Figure 2:
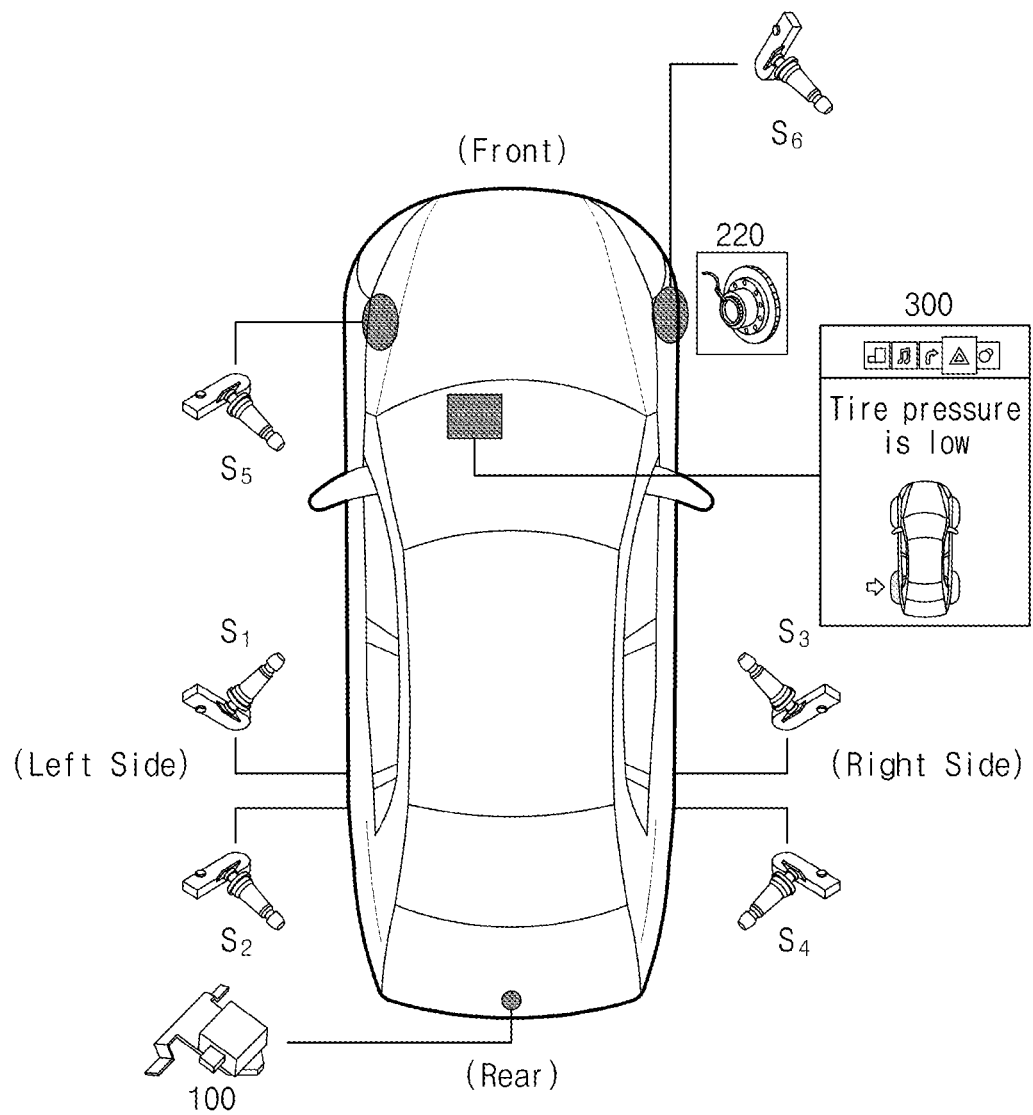
FIG. 2 illustrates an example in which a tire pressure sensor is mounted in a vehicle according to an exemplary embodiment of the present disclosure.

FIG. 1 illustrates a block diagram showing a configuration of a vehicle system including a tire pressure sensor location determining apparatus 100 according to an exemplary embodiment of the present disclosure. FIG. 2 illustrates an example in which a tire pressure sensor 210 is mounted in a vehicle according to an exemplary embodiment of the present disclosure.

Referring to FIG. 1, a vehicle system 10 may include a tire pressure sensor location determining apparatus 100 and a sensing device 200.

The tire pressure sensor location determining apparatus 100 may determine a location of a tire pressure sensor 210 by utilizing wheel pulse counter values inputted from a plurality of wheel speed sensors 220 and a plurality of tire pressure detection signals emit from a corresponding plurality of tire pressure sensors 210.

The tire pressure sensor location determining apparatus 100 may determine whether each of the tire pressure sensors 210 is mounted in a left wheel of the vehicle or a right wheel of the vehicle by utilizing wheel pulse counter values, and may determine whether each of the tire pressure sensors is mounted in an inner wheel or an outer wheel by using rotational acceleration.

The tire pressure sensor location determining apparatus 100 according to the exemplary embodiment of the present disclosure may be implemented inside of a vehicle. The tire pressure sensor location determining apparatus 100 may be integrally formed with internal control units of the vehicle, and/or may be implemented as a separate device to be connected to various control units of the vehicle by a separate connection means.

In terms of structure, the tire pressure sensor location determining apparatus 100 may include a communication device 110, a memory storage 120, an interface device 130, and a processor 140.

The communication device 110, which may be a hardware device implemented with various electronic circuits to transmit and receive signals through a wireless and/or wired connection, may perform various communication techniques by using an in-vehicle network communication technique(s) or wireless internet access technique(s) or short range communication technique(s) with servers, infrastructure, and even other vehicles. As used herein, in-vehicle communication techniques may be performed through controller area network (CAN) communication, local interconnect network (LIN) communication, and/or flex-ray communication. As used herein, the wireless communication techniques may include wireless LAN (WLAN), wireless broadband (Wibro), Wi-Fi, world Interoperability for microwave access (Wimax), etc. In addition, short-range communication techniques may include bluetooth, ZigBee, ultra wideband (UWB), radio frequency identification (RFID), infrared data association (IrDA), and the like.

As an example, the communication device 110 may receive a respective sensing result (such as a signal) from a tire pressure sensor 210 and therefore act as a receiver. Furthermore, the communication device 110 may receive information pertaining to a respective location of a specific tire pressure sensor among the plurality of tire pressure sensors.

The memory storage 120 may store sensing results (such as results stemming from the received signals) of the sensing device 200, data and algorithms driven by the processor 140, and the like.

As an example, the memory storage 120 may store a tire pressure detection signal received from each specific tire pressure sensor 210 mounted in each corresponding tire. Likewise, the memory storage 120 may store a wheel pulse counter signal received from a wheel speed sensor 220 mounted in each corresponding wheel.

The memory storage 120 may include a storage medium of at least one type chosen among memories such as, for example, a flash memory, a hard disk, a micro, a card (e.g., a secure digital (SD) card or an extreme digital (XD) card), a random access memory (RAM), a static RAM (SRAM), a read-only memory (ROM), a programmable ROM (PROM), an electrically erasable PROM (EEPROM), a magnetic memory (MRAM), a magnetic disk, and an optical disk.

The interface device 130 may include an input means for receiving a control command from a user and an output means for outputting an operation state of the tire pressure sensor location determining apparatus 100 and results thereof. For example, the interface device 130 may display and provide a warning for an air pressure state of each respective tire of the vehicle when a warning is appropriate. In addition, when the vehicle includes a double wheel, the interface device 130 may display information indicating whether the air pressure state corresponds to an inner wheel or an outer wheel of a double wheel, and whether the air pressure state corresponds to a left double wheel or a right double wheel.

Herein, various input devices may include a key button, and may include a mouse, a joystick, a jog shuttle, a stylus pen, and the like for example. Furthermore, the input devices may include a soft key, e.g., a touch screen, implemented integrally with the display.

The output device may include a display and may also include a voice and/or sound output means such as a speaker. In the instant case, when a touch sensor formed of a touch film, a touch sheet, or a touch pad is provided on the display, the display may operate as a touch screen, and may be implemented in a form in which an input device and an output device are integrated.

In the instant case, the display may include at least one of a liquid crystal display (LCD), a thin film transistor liquid crystal display (TFT LCD), an organic light emitting diode display (OLED display), a projector display, a flexible display, a field emission display (FED), and/or a 3D display.

As an example, the interface device 130 may be implemented as a head-up display (HUD), a cluster, an audio video navigation (AVN), or a human machine interface (HMI). In addition, the interface device 130 may include at least one of a liquid crystal display (LCD), a thin film transistor liquid crystal display (TFT LCD or thin film transistor-LCD), a light emitting diode (LED) display, an organic light emitting diode (OLED or organic LED) display, an active OLED (AMOLED or active matrix OLED) display, a flexible display, a bended display, and a 3D display. Some of these displays may be implemented as a transparent display formed of a transparent or translucent type such that the outside can be viewed. In addition, the interface device 130 may be provided as a touch screen including a touch panel, and may be used as an input device as well as an output device. In FIG. 2, an example in which an air pressure of each tire is displayed on a display device 300 in the vehicle separately from the interface device 130 is disclosed.

The processor 140 may be in communication with and/or electrically connected to the communication device 110, the memory storage 120, the interface device 130, and the like. The processor 140 may electrically control each component, and may be an electrical circuit that executes software commands, thereby performing various data processing and calculations described below. The processor 140 may be, e.g., an electronic control unit (ECU), a micro controller unit (MCU), or other subcontrollers mounted in the vehicle.

That is, the processor 140 may determine whether each of the tire pressure sensors is mounted in a left wheel or a right wheel of the vehicle by using the wheel pulse counter values, and may determine whether each of the tire pressure sensors is mounted in an inner wheel or an outer wheel of a double wheel by using rotational acceleration.

In the instant case, the wheel pulse counter value, which is a wheel pulse counter signal, indicating values obtained by converting a wheel pulse signal that is outputted as many as a number of cogs/teeth of a tone wheel into a CAN signal. This will be described in further detail below with reference to FIG. 8.

The processor 140 may compare wheel pulse counter values of each wheel speed sensor inputted whenever a tire pressure detection signal (e.g., RF signal) is transmitted to each tire pressure sensor, and therefrom may determine a respective pair of tire pressure sensors having a constant difference value.

The processor 140 may determine that a respective pair of tire pressure sensors are positioned at a double wheel corresponding to a wheel pulse counter value having a constantly increasing value among wheel pulse counter values inputted from the wheel speed sensor of each wheel whenever the pair of tire pressure sensors respectively transmit tire pressure detection signals.

Furthermore, the processor 140 may determine whether the tire pressure sensor is positioned in an outer wheel or an inner wheel of a double wheel depending on a direction in which rotational acceleration increases or decreases by using rotational acceleration signals received from the two respective tire pressure sensors of the double wheel.

In one example, when the tire pressure sensor 210 mounted in the inner wheel rotates clockwise when a vehicle wheel rotates, the rotational acceleration increases in a (+) direction, and the tire pressure sensor 210 mounted in the outer wheel rotates counterclockwise to increase the rotational acceleration in a (−) direction.

Accordingly, the processor 140 may determine that a tire pressure sensor 210 whose rotational acceleration increases in the (+) direction is positioned in the inner wheel, and a tire pressure sensor whose rotational acceleration increases in a (−) direction is positioned in the outer wheel, among a pair of tire pressure sensors determined to be positioned in the left rear double wheel of the vehicle, The processor 140 may determine that a tire pressure sensor whose rotational acceleration increases in the (+) direction is positioned in the outer wheel, and a tire pressure sensor whose rotational acceleration increases in a (−) direction is positioned in the inner wheel 301, among a pair of tire pressure sensors determined to be positioned in the right rear double wheel of the vehicle.

The sensing device 200 may include a tire pressure sensor 210 for detecting tire pressure, and a wheel speed sensor 220.

A respective tire pressure sensor 210 may be mounted on each wheel of the vehicle, and may measure an air pressure of a tire of each wheel, and may provide it to the tire pressure sensor location determining apparatus 100. In the instant case, in the case of a single-wheeled vehicle, one tire pressure sensor 210 may be mounted in each wheel. In the case where each of the rear wheels are configured as a double wheel, a total of six tire pressure sensors 210 may be mounted in the six tires of the vehicle. As illustrated in FIG. 2, a left rear wheel, which in this case is a left double wheel, includes left inner and outer tires in which tire pressure sensors $S_1$ and $S_2$ are respectively mounted. Additionally, tire pressure sensors $S_3$ and $S_4$ are mounted in the inner and outer wheels of the right rear double wheel tire, respectively. Additionally, the front wheels, which are each a single wheel in this embodiment, include tire pressure sensors $S_5$, and $S_6$ which are mounted at left and right sides of the vehicle, respectively. As used herein, respective and individual tire pressure sensors 210 may be referred to by an alternate and consistent nomenclature, e.g., $S_1$ and $S_2$ which may refer to distinct Sensor 1 and Sensor 2 which are each tire pressure sensors 210. Similar consistent nomenclature may be used for third, fourth, fifth, and sixth tire pressure sensors (e.g., $S_3$, $S_4$, $S_5$, and $S_6$). In this sense, those with skill in the art will appreciate that each individual tire pressure sensor 210 may be referred to by an alternate nomenclature while remaining consistent with the scope and spirit of the disclosure herein.

Furthermore, the tire pressure sensor 210 may recognize rotational acceleration. Furthermore, the tire pressure sensor 210 may transmit a tire pressure detection signal when a vehicle wheel reaches a predetermined location during rotation, and the tire pressure sensors respectively mounted in the outer wheel 302 and inner wheel 301 have a constant phase difference. This will be additionally described with reference to FIG. 7.

The wheel speed sensor 220 outputs a wheel pulse counter signal depending on wheel rotation of the vehicle. In various embodiments, a wheel speed sensor 220 may be mounted in each wheel of all the wheels of the vehicle. For example, in the case of a double wheel vehicle, it may be mounted in an inner wheel 301 and an outer wheel separately. Alternatively, wheel speed sensors 220 may be mounted in only one of the inner or outer wheels of each respective dual wheel (e.g., a total of four wheel speed sensors). In the instant case, the wheel pulse counter signal may refer to a signal in which the number of rotations of the wheel is counted over a predetermined time period.

Figure 3:
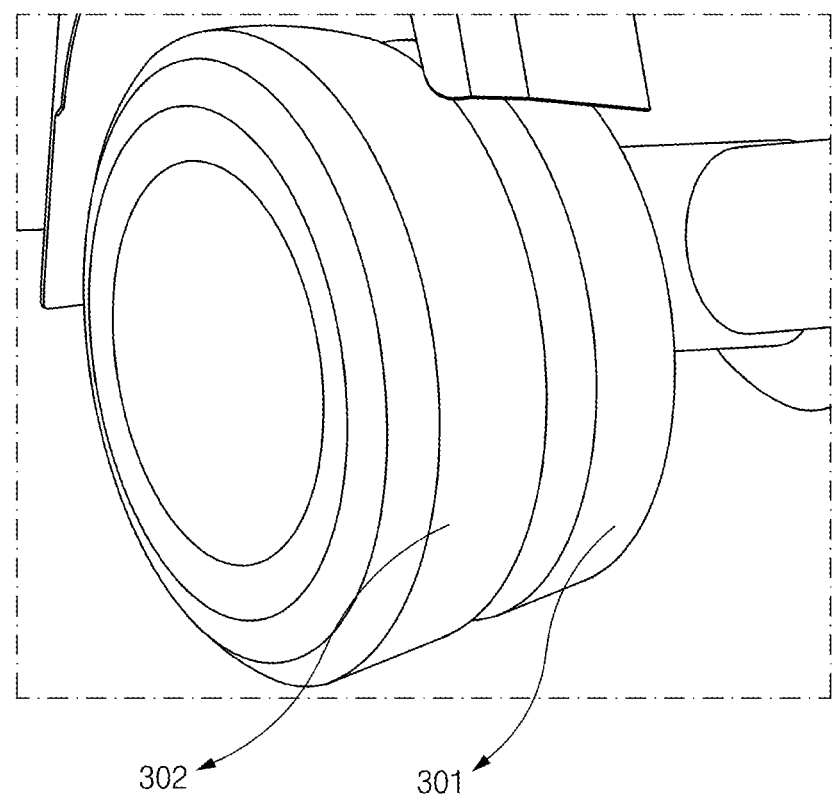
FIG. 3 illustrates an example of a double wheel of a vehicle according to an exemplary embodiment of the present disclosure.
Figure 4:
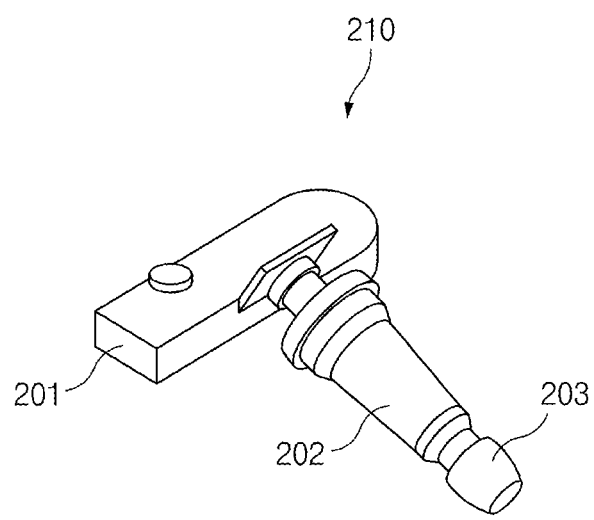
FIG. 4 illustrates a detailed schematic diagram of a tire pressure sensor according to an exemplary embodiment of the present disclosure.

FIG. 3 illustrates an example of a double wheel of a vehicle according to an exemplary embodiment of the present disclosure, and FIG. 4 illustrates a detailed schematic diagram of a tire pressure sensor according to an exemplary embodiment of the present disclosure. In FIG. 3, the double wheel is disposed on a right side of the vehicle and on a rear axle (see also labelling in FIG. 2).

In the case of a vehicle in which a rear wheel of the vehicle includes two wheels as illustrated in FIG. 3, tire pressure sensors may be mounted in an inner wheel 301 and an outer wheel 302 of the double wheel, respectively. In this way, two respective sensors are mounted in the left and right front wheels and four respective sensors are mounted in the left double wheel and the right double wheel bringing the total number of mounted sensors in the vehicle to six. Stated another way, each individual wheel may include a corresponding tire pressure sensor 210 and in the case of a double wheel each of the inner wheel and outer wheel may receive a respective tire pressure sensor 210.

Referring to FIG. 4, an example tire pressure sensor 210 is illustrated. In this embodiment, the tire pressure sensor 210 includes a sensor body 201, a valve 202, and a cap 203. Furthermore, different sensor IDs may be assigned to each sensor for identification and each tire pressure sensor 210 may transmit a unique sensor ID as a signal to the tire pressure sensor location determining apparatus 100.

Figure 5:
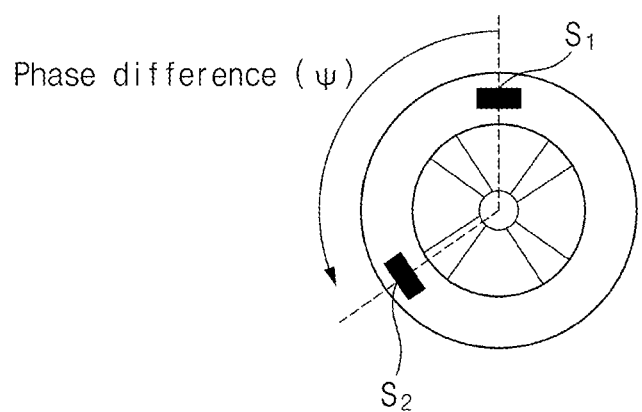
FIG. 5 illustrates an example showing a mounting location of each tire pressure sensor on a double wheel according to an exemplary embodiment of the present disclosure.
Figure 6:
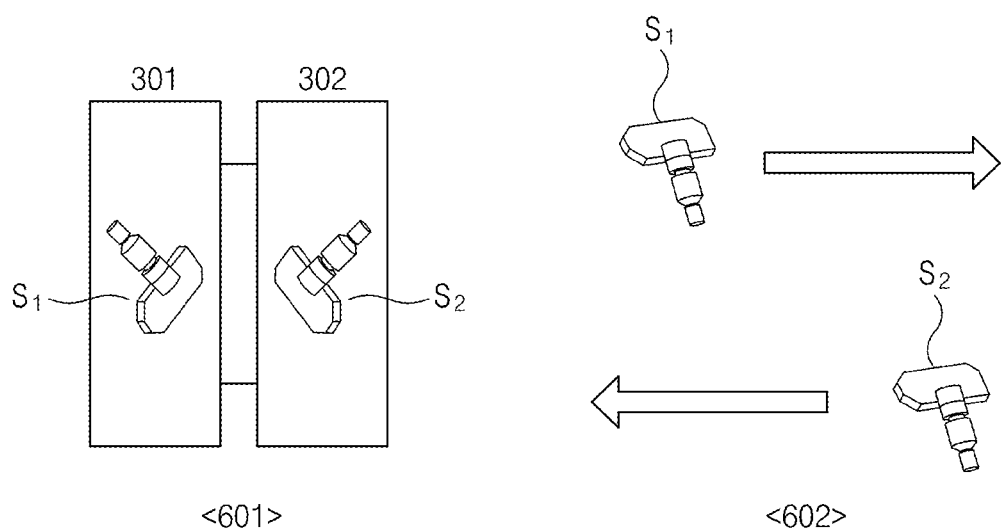
FIG. 6 illustrates a view for describing a mounting direction and a rotation direction of each tire pressure sensor mounted on a double wheel according to an exemplary embodiment of the present disclosure.

FIG. 5 illustrates an example showing a mounting location of each tire pressure sensor on a double wheel according to an exemplary embodiment of the present disclosure, and FIG. 6 illustrates a view for describing a mounting direction and a rotation direction of each tire pressure sensor mounted on a double wheel according to an exemplary embodiment of the present disclosure.

A location of each of the tire pressure sensors $S_1$ and $S_2$ such that a phase difference $\psi$ between the tire pressure sensor $S_1$ and the tire pressure sensor $S_2$, respectively mounted on the inner wheel 301 and the outer wheel 302 of the double wheel, fixed on one axis may remain constant.

When the communication device 110 receives a RF signal from each of the tire pressure sensors $S_1$ and $S_2$, there is a constant difference between wheel pulse counter values (depending on the phase difference between the tire pressure sensors $S_1$ and $S_2$).

When the tire pressure sensors of the front and rear wheels transmit RF signals, the tire pressure sensor location determining apparatus 100 may distinguish whether each of the respective tire pressure sensors of the left front wheel and right front wheel and the two respective pairs of sensors of the rear wheels are provided at a right rear side or a left rear side of the vehicle by using wheel pulse counter values of a left wheel (LW) and a right wheel (RW) of the vehicle. In some embodiments, and depending on context which is clear to a skilled artisan, LW may refer to a double wheel disposed on the rear axle of a vehicle and on the left side. Similarly, in some embodiments, and depending on context which is clear to a skilled artisan, RW may refer to a double wheel disposed on the rear axle of a vehicle and on the right side.

Furthermore, as illustrated in FIG. 6, in a double wheel tire including two wheels, the tire pressure sensor $S_1$ mounted in an inner wheel 301 and the tire pressure sensor $S_2$ mounted in the outer wheel 302 may be mounted in opposite directions. For example, view 601 depicts a double wheel tire disposed on a rear axle of a vehicle and on the right side of the vehicle. Accordingly, rotational acceleration of the tire pressure sensors $S_1$ and $S_2$ have opposite polarities (+, −) depending on rolling of the wheel, and the tire pressure sensor location determining apparatus 100 may determine whether mounting locations of the tire pressure sensors are in an outer wheel 302 or an inner wheel 301 of a corresponding double-wheeled tire (see also, FIG. 3).

View 601 illustrates an example showing a mounting direction of tire pressure sensors mounted in a double wheel according to an exemplary embodiment of the present disclosure, and view 602 illustrates an example for describing a rotation direction of tire pressure sensors mounted in a double wheel according to an exemplary embodiment of the present disclosure.

Referring to the view 602, when a wheel shaft rotates clockwise, when viewed from the valve, the right sensor $S_2$ rotates clockwise and the left sensor $S_1$ rotates counterclockwise. Hereinafter, a method of distinguishing whether a specific tire pressure sensor is mounted in any one of the left wheels LW and the right wheels RW of the vehicle will be described in detail with reference to FIG. 7 through FIG. 10. For example, when an air pressure state of one respective tire pressure of a total of six tire pressures is below a pre-determined reference level, the specific tire in question may be determined. Accordingly, it may be beneficial to determine the mounting location of the corresponding tire pressure sensor whose corresponding tire pressure state is detected to be below the pre-determined reference level. In various embodiments, this may include a determination whether the corresponding tire pressure sensor is mounted in the left tire or the right tire of the vehicle, and in the case of a double wheel, it may also be beneficial to determine whether the corresponding tire pressure sensor is mounted in an inner wheel or an outer wheel.

Figure 7:
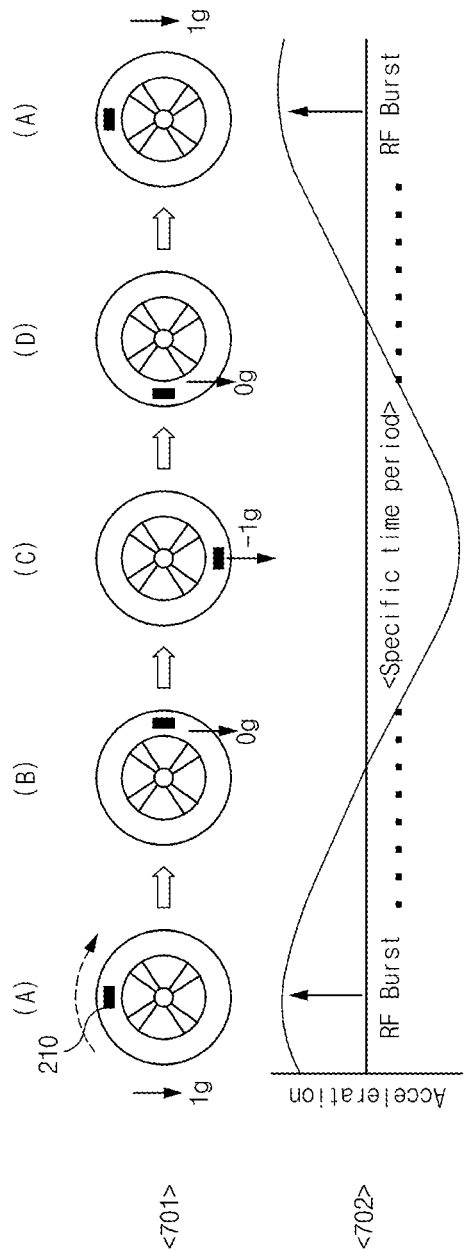
FIG. 7 illustrates a view for describing an example of an RF signal transmission time point of a tire pressure sensor according to an exemplary embodiment of the present disclosure.

FIG. 7 illustrates a view for describing an example of an RF signal transmission over time of a tire pressure sensor according to an exemplary embodiment of the present disclosure. Referring to FIG. 7, the tire pressure sensor 210 is set to transmit an RF signal at a specific location. In the example embodiment, the specific location refers to an uppermost end of a wheel tire shown as (A). In this position, an RF signal and/or "RF Burst" is emit, and it may be predetermined by an experimental value. Furthermore, in FIG. 7, a case of transmitting an RF signal when it is positioned at the uppermost end is taken as an example, but the present disclosure is not limited thereto, and it can be set to transmit RF signals at various locations, e.g., a first intermediate middle position (B), a lowermost end of a wheel tire (C) and/or a second intermediate middle position (D). In various embodiments, the RF signal may be transmitted when an acceleration value measured by the tire pressure sensor 210 is 1 g (indicated by arrows).

As illustrated in the view 701, while a wheel rotates forward (indicated by clockwise arrow at point (A)), the acceleration value changes from positions (A) to (B) to (C) to (D) and back to (A) as: 1 g→0 g→-1 g→0 g→1 g. As illustrated in the view 702, when the tire is in a 1 g position in an acceleration changing graph (the (A) position), the RF signal is transmitted by the tire pressure sensor 210.

Figure 8:
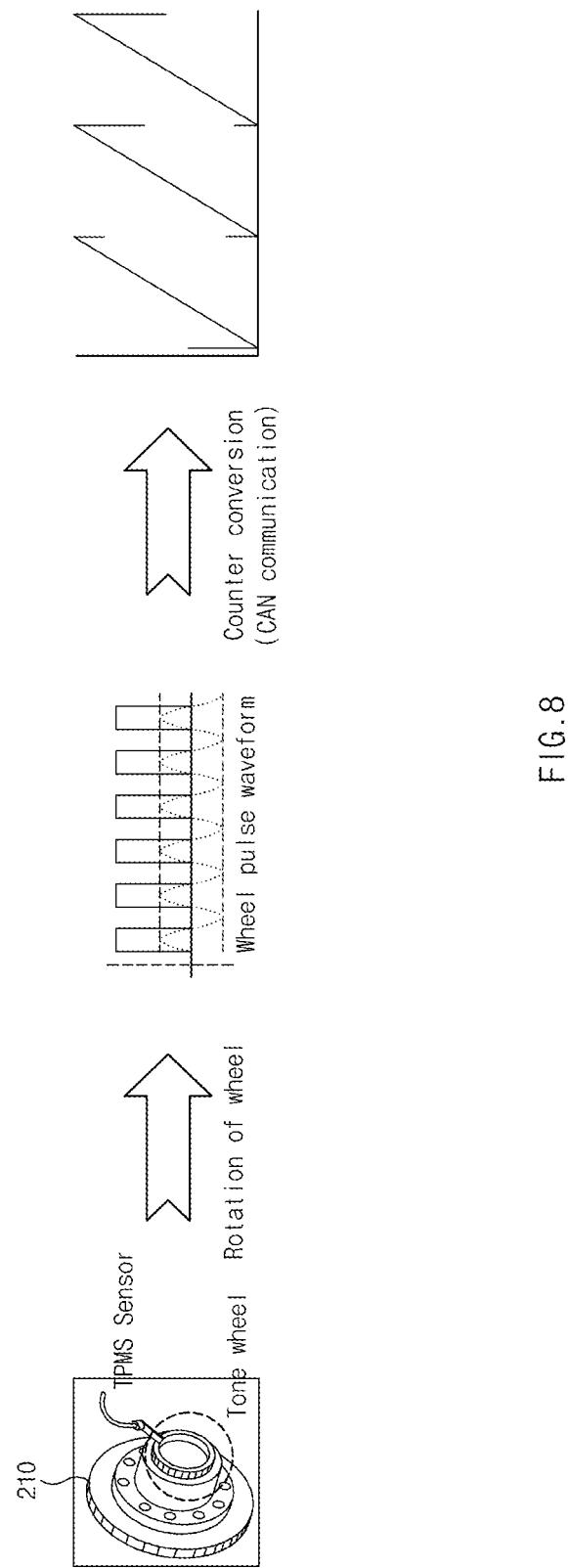
FIG. 8 illustrates a view for describing an example of generating a wheel pulse counter signal based on a wheel speed sensor according to an exemplary embodiment of the present disclosure.

FIG. 8 illustrates a view for describing an example of generating a wheel pulse counter signal based on a wheel speed sensor according to an exemplary embodiment of the present disclosure. Referring to FIG. 8, a wheel pulse counter signal depending on wheel rotation is generated based on the wheel speed sensor 220 and a tone wheel (e.g., having 48 teeth) is positioned inside a wheel rotation shaft. In the instant case, when a number of teeth of the tone wheel is 48, a total of 48 pulses may be generated by the wheel speed sensor 220, and generated pulse signals may be received by an electronic speed control (ESC) unit which may refer to an electronic circuit that receives, processes, controls and/or regulates the rotational speed of something, e.g., a tire. In turn, the pulse signals may be converted into wheel speed counter signals, which may be referred to as "CAN signals" and/or "CAN communication" in this disclosure and in particular in FIG. 8. In various embodiments, the ESC unit may be configured to transmit the wheel speed counter signals to various in-vehicle devices based on any of the in-vehicle communication technologies discussed above. Those with skill in the art will also recognize that wheels may have various numbers of teeth and that in other embodiments the number of teeth may correspond 1:1 with the number of pulse signals without deviating from the scope and spirit of this disclosure.

Figure 9:
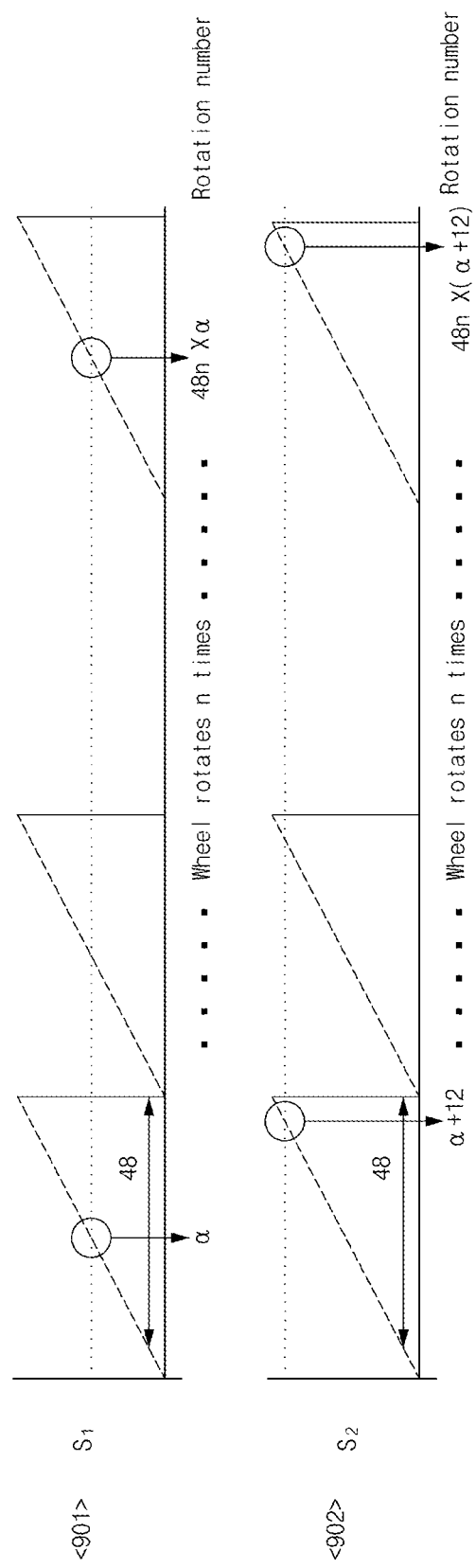
FIG. 9 illustrates a view for describing a difference between wheel pulse counter values of each tire pressure sensor of a double wheel according to an exemplary embodiment of the present disclosure.

FIG. 9 illustrates a view for describing a difference between wheel pulse counter values of each tire pressure sensor of a double wheel according to an exemplary embodiment of the present disclosure. In the example illustration, view 901 corresponds to a first sensor $S_1$ of an inner wheel 301 and view 902 corresponds to a second sensor $S_2$ of an outer wheel 302 of a double wheeled tire (see also FIG. 3).

When transmitting signals, two tire pressure sensors $S_1$ and $S_2$ (see FIG. mounted in each of inner wheel 301 and outer wheel 302 of a double-wheeled tire (see FIG. 3) constrained to one common rotation axis and rotating may have a constant wheel pulse value difference that is equal to a phase difference (i.e., a difference in phase). For example, when one wheel has 48 wheel pulse counters and the two tire pressure sensors $S_1$ and $S_2$ respectively mounted in the inner wheel 301 and outer wheel 302 are mounted to have a phase difference of degrees, for example, the two respective tire pressure sensors $S_1$ and $S_2$ may transmit respective signals resulting in a wheel pulse counter difference being 12 (12=48*(90/360)).

When rear left and rear right sides of the vehicle are each double-wheeled tires (see FIG. 5), a total of four tire pressure sensors 210 (e.g., $S_1$, $S_2$, $S_3$, and $S_4$) are mounted to the rear double wheels. As described above, when receiving RF signals from each of the four tire pressure sensors (e.g., $S_1$, $S_2$, $S_3$, and $S_4$), the tire pressure sensor location determining apparatus 100 may compare each respective wheel pulse counter signal that is inputted and/or received from the corresponding wheel speed sensor 220 at the same time. Additionally, the tire pressure sensor location determining apparatus 100 may classify two sensors (chosen from $S_1$, $S_2$, $S_3$, and $S_4$) that have a constant difference in wheel pulse counter values and separately identify them. For example, the tire pressure sensor location determining apparatus 100 may group two sensors chosen from $S_1$, $S_2$, $S_3$, and $S_4$ into a first pair and group the remaining two sensors into a second pair. For example, two respective pairs may include e.g., ($S_1$ and $S_2$) and ($S_3$ and $S_4$).

Figure 10:
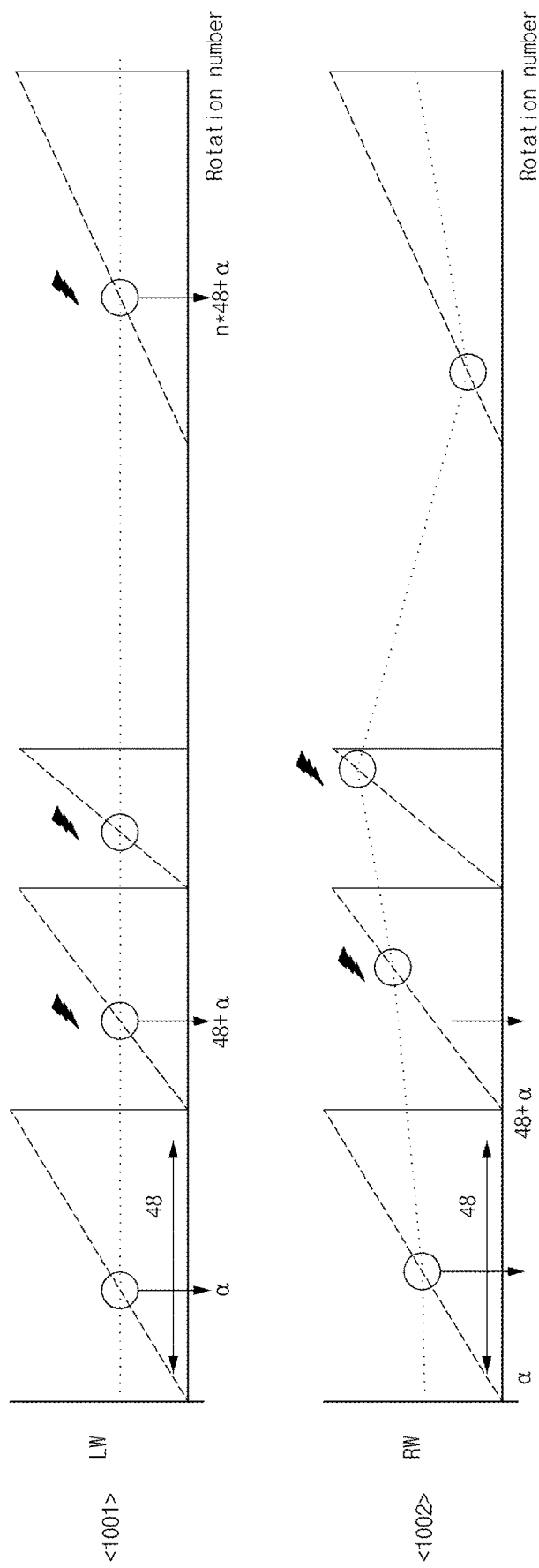
FIG. 10 illustrates a view for describing an example of distinguishing right and left wheels by using a difference between wheel pulse counter values of each tire pressure sensor of a double wheel according to an exemplary embodiment of the present disclosure.

FIG. 10 illustrates a view for describing an example system and method of distinguishing right and left wheels by using a difference between wheel pulse counter values of each tire pressure sensor of a double wheel according to an exemplary embodiment of the present disclosure.

The tire pressure sensor location determining apparatus 100 may distinguish left and right sides of the wheel by comparing the tire pressure sensor signal (e.g., from $S_1$) with wheel pulse counter signals of the left wheel LW and the right wheel RW using any one tire pressure sensor (e.g., $S_1$) among the tire pressure sensors grouped as pairs as explained above.

For example, the tire pressure sensor 210 transmits an RF signal when it is positioned at an uppermost side of the wheel regardless of a vehicle speed and a turning radius (see, e.g., FIG. 7—view 701). Accordingly, whenever the tire pressure sensor transmits signals, a wheel pulse counter value inputted from the wheel speed sensor 220 should increase by a multiple of a number of wheel pulses per wheel. In this way, the wheel pulse counter signal constantly increases whenever the RF signal of the tire pressure sensor is transmitted, and the tire pressure sensor location determining apparatus 100 may determine that the tire pressure sensor being analyzed is mounted in a specific corresponding wheel.

Views 1001 and 1002 are examples when the tire pressure sensor 210 (not illustrated in FIG. 10) is mounted on a left wheel LW and a right wheel RW. In this embodiment, the view 1001 indicates a wheel pulse counter signal for a left wheel LW, and the view 1002 indicates a wheel pulse counter signal for a right wheel RW. Referring to the view 1001, it can be seen that the wheel pulse counter signal of the wheel equipped with the correctly identified tire pressure sensor is constantly increasing (e.g., increasing predictably in a linear way and/or linear multiple way). For example, the wheel pulse counter signal becomes a multiple of the wheel pulse counter value depending on a number of tone wheels (e.g., 48 teeth of a tone wheel as explained above).

The view 1002 indicates the wheel pulse counter signal of the specific wheel RW that does not match a location of the tire pressure sensor being analyzed by the tire pressure sensor location determining apparatus 100. As may be seen in view 1002, the wheel pulse counter signal is not constant and/or constantly increasing in a predictable linear and/or linear multiple way. This may be due to the particular tire being affected by wheel spin and turning radius implications.

With reference back to the analyzation methodologies discussed above with respect to FIG. 7 through FIG. 10 described above, it is possible to distinguish whether respective pairs of sensors are mounted in the left wheel LW or the right wheel RW of the vehicle. For example, whether a respective pair is mounted to the left rear double wheel or the right rear double wheel. In this way, the tire pressure sensor location determining apparatus 100 may determine a first pair of sensors is mounted to a left double wheel and a second pair of sensors is mounted to a right double wheel.

Figure 11:
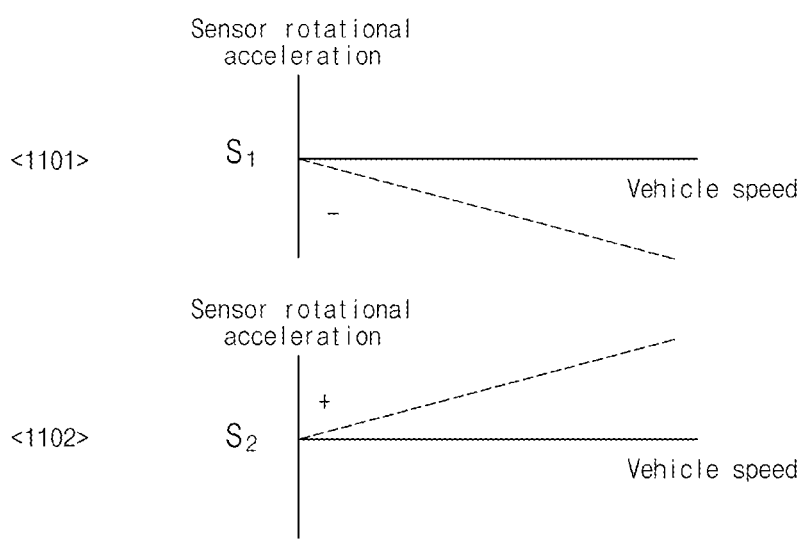
FIG. 11 illustrates a view for describing an example of determining inner and outer wheels using rotational acceleration of each tire pressure sensor of a double wheel according to an exemplary embodiment of the present disclosure.

FIG. 11 illustrates a view for describing an example method of determining whether the tire pressure sensor is disposed on an inner wheel or an outer wheel. For example, by using rotational acceleration of each respective tire pressure sensor of a double wheel according to an exemplary embodiment of the present disclosure. In various embodiments, it may be desired to distinguish whether each of the two tire pressure sensors $S_1$ and $S_2$ of a double-wheeled tire are mounted in an inner wheel 301 or an outer wheel 302 of the double-wheeled tire.

In various embodiments, the tire pressure sensor location determining apparatus 100 may distinguish whether each sensor (of the two corresponding tire pressure sensors $S_1$ and $S_2$ of the particular double wheel) corresponds to the inner wheel 301 or the outer wheel 302 (see FIG. 3) by using a mounting direction of the tire pressure sensors and a rotational acceleration signal. Consistent with the disclosure herein, a first tire pressure sensor $S_1$ may be mounted in the outer wheel 302 of the double-wheeled tire so that air can be injected into the tire from the open side (side facing away from inner tire 301) and the other tire pressure sensor $S_2$ may be mounted in the inner wheel so that air can be injected from the open side (side facing away from outside tire 302), and thus they are mounted in opposite directions as explained above with reference to FIG. 6. In this way, when the wheel at issue rotates in a same direction as viewed from the front of the tire pressure sensor, the rotational acceleration consistently increases to a (+) value, and the tire pressure sensor mounted at an opposite side rotates in an opposite direction, and thus rotational acceleration consistently increases to a (−) value. Moreover, as shown by comparing views 1101 and 1102, the slope of the acceleration of $S_1$ and $S_2$ correspond to one another in extent and/or amount but are in opposite directions.

With reference back to FIG. 6, as illustrated in the view 601 described above, when tire pressure sensors 210 are mounted in inner and outer wheels respectively, when wheel rolling occurs, the two tire pressure sensors 210 mounted in the inner wheel 301 and outer wheel 302 respectively rotate in opposite directions (see also FIG. 3). Assuming that the wheel rotates clockwise, a tire pressure sensor mounted in a right tire of a double wheel rotates clockwise, and as a rolling speed of the wheel increases, the rotational acceleration gradually increases to a (+) value. On the other hand, the tire pressure sensor mounted in a left tire of the double wheel rotates in the opposite direction, anticlockwise, and as the speed increases, the rotational acceleration gradually increases to a (−) value.

Accordingly, when the tire pressure sensor is mounted in the left side LW of the vehicle, it can be seen that the tire pressure sensor having (+) acceleration during vehicle driving is mounted in the inner wheel 301, and the tire pressure sensor having (−) acceleration is mounted in the outer wheel 302. On the other hand, when it is installed on the right side RW of the vehicle, conversely, it can be seen that the tire pressure sensor with (+) acceleration is mounted in the outer wheel, and the tire pressure sensor with (−) acceleration is mounted in the inner wheel. As such, the tire pressure sensor location determining apparatus 100 may distinguish between the inner and outer wheels of the double-wheeled tire based on the rotational acceleration.

In various embodiments, in a vehicle in which each of the rear wheels are configured as double-wheel tires, like a commercial vehicle, farm vehicle, or a multi-purpose utility vehicle for example, a total of four tire pressure sensors 210 are mounted in the two rear wheels, and accurate location determination of the specific tire pressure sensor may be required at low pressure. Accordingly, when receiving an RF signal from a tire pressure sensor 210, the tire pressure sensor location determining apparatus 100 may determine an accurate location of the specific tire pressure sensor 210 by referring to a wheel pulse counter inputted from the wheel speed sensor 220 and a tire pressure sensor acceleration change depending on direction of wheel rotation being clockwise or counterclockwise.

Figure 12:
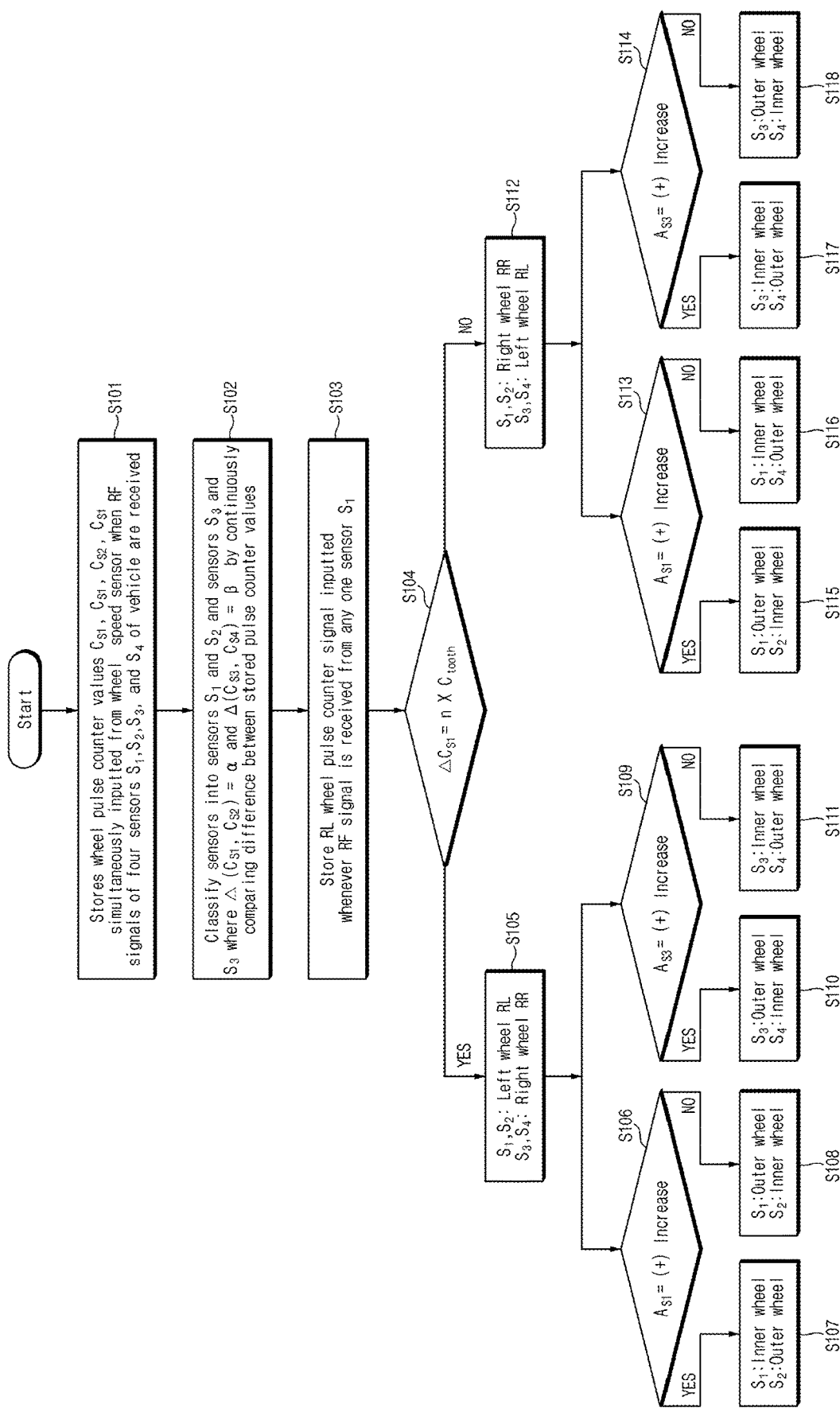
FIG. 12 illustrates a flowchart for describing a tire pressure sensor location determining method according to an exemplary embodiment of the present disclosure.

Hereinafter, a tire pressure sensor location determining method according to an exemplary embodiment of the present disclosure will be described in detail with reference to FIG. 12. FIG. 12 illustrates a flowchart for describing a tire pressure sensor location determining method according to an exemplary embodiment of the present disclosure.

In various embodiments, the tire pressure sensor location determining apparatus 100 of FIG. 1 may be configured to perform a process illustrated by FIG. 12. In addition, in the description of FIG. 12, operations described as being performed by a device may be understood as being controlled by the processor 140 of the tire pressure sensor location determining apparatus 100.

For example, a case in which a total of four sensors $S_1$, $S_2$, $S_3$, and $S_4$ are mounted to a left rear double wheel and right rear double wheel, respectively, will be described by an example case in which only the rear wheels of the vehicle are double wheels.

Referring to FIG. 12, when RF signals of four sensors $S_1$, $S_2$, $S_3$, and $S_4$ of the vehicle are received by a receiver (e.g., a communication device), the tire pressure sensor location determining apparatus 100 stores wheel pulse counter values $C_{S1}$, $C_{S2}$, $C_{S3}$, $C_{S4}$ which are simultaneously inputted from the respective wheel speed sensors 220 (S101).

Then, the tire pressure sensor location determining apparatus 100 determines and/or calculates a difference $\Delta C_p$ between each of the wheel pulse counter values. Since each wheel of a double-wheeled tire is constrained to the same rotation shaft, the two tire pressure sensors mounted in each of the inner wheel 301 and outer wheel 302 may have a wheel pulse counter difference determined by a certain phase difference. Accordingly, the tire pressure sensor location determining apparatus 100 may classify the tire pressure sensors 210 in which the wheel pulse counter difference continuously has constant values α and β into pairs (S102).

That is, the tire pressure sensor location determining apparatus 100 may classify the sensors into a first pair of sensors $S_1$ and $S_2$ and a second pair of sensors $S_3$ and $S_4$ where $\Delta(C_{S1}, C_{S2})=\alpha$ and $\Delta(C_{S3}, C_{S4})=\beta$.

Then, the tire pressure sensor location determining apparatus 100 stores an LW wheel pulse counter signal inputted from the wheel speed sensor 220 whenever an RF signal is received from any one sensor, e.g., $S_1$ (S103).

Accordingly, the tire pressure sensor location determining apparatus 100 determines a location at which an input wheel pulse counter $C_{S1}$, inputted when the sensor $S_1$ transmits a signal that constantly increases by a multiple of a number of tone wheels corresponding to the teeth number of the tone wheel (e.g., 48), using any one tire pressure sensor $S_1$ and the wheel pulse counter inputted from the left wheel LW or right wheel RW (S104). Accordingly, the tire pressure sensor location determining apparatus 100 determines that the corresponding location—is a location where two pairs of sensors are mounted (S104).

For example, the wheel pulse counter of the wheel equipped with the tire pressure sensor $S_1$ increases constantly, and thus when the tire pressure sensor $S_1$ transmits a signal, the input wheel pulse counter $C_{s1}$ constantly increases by the multiple of the number of the teeth of the tone wheel (e.g., 48). Therefore, it may be determined that the tire pressure sensor $S_1$ is mounted in the corresponding wheel LW.

The tire pressure sensor location determining apparatus 100 determines whether the tire pressure sensor is positioned in the left double wheel or the right double wheel through the above steps S101 to S104. Thereafter, the tire pressure sensor location determining apparatus 100 determines whether the tire pressure sensor at issue is mounted to the inner wheel 301 or the outer wheel 302 based on rotational acceleration.

In a double-wheeled tire, tire pressure sensors 210 are mounted in each of the inner wheel 301 and outer wheel 302 in opposite directions as explained above. Accordingly, the pair of tire pressure sensors for each double wheel rotate in opposite directions depending on rolling of the wheel, and the rotational accelerations $A_{S1}$, $A_{S2}$, $A_{S3}$, and $A_{S4}$ measured by the tire pressure sensors 210 also have opposite polarities as explained above. When a double-wheeled tire rotates clockwise, the tire pressure sensors mounted in a right side rotate clockwise relative to a reference point viewed by directly looking at the tire pressure sensor, and thus the rotational acceleration increases in a (+) direction. Additionally, the tire at a left side rotates in a counterclockwise direction to enable it to become a (−) direction acceleration as explained above with reference to FIG. 11. Therefore, when the double-wheeled tire is mounted in the left side LW of the vehicle, the inner wheel 301 has an acceleration in the (+) direction, and the outer wheel 302 has an acceleration in the (−) direction. Conversely, when mounted in the right side RW of the vehicle, the outer wheel has an acceleration in the (+) direction, and the inner wheel has an acceleration in the (−) direction.

In step S104, when it is determined that the tire pressure sensors $S_1$ and $S_2$ are positioned in the left rear wheel LW and the tire pressure sensors $S_3$ and $S_4$ are positioned in the right rear wheel RW (S105), the tire pressure sensor location determining apparatus 100 determines whether there is an increasing or decreasing direction of the rotational acceleration $A_{S1}$ (S106) for each tire pressure sensor. Accordingly, the tire pressure sensor location determining apparatus 100 may determine that the tire pressure sensor $S_1$ is positioned in the inner wheel and the tire pressure sensor $S_2$ is positioned in the outer wheel (S107) when the rotational acceleration $A_{S1}$ increases in the (+) direction, and may determine that the tire pressure sensor $S_1$ is poisoned in the outer wheel, and the tire pressure sensor $S_2$ is positioned in the inner wheel (S108) when the rotational acceleration $A_{S1}$ increases in the (−) direction.

On the other hand, the tire pressure sensor location determining apparatus 100 may determine an increasing or decreasing direction of the rotational acceleration $A_{S3}$ (S109), when the rotational acceleration $A_{S3}$ increases in the (+) direction. The tire pressure sensor location determining apparatus 100 may determine that the tire pressure sensor $S_3$ is positioned in the outer wheel and the tire pressure sensor $S_4$ is positioned in the inner wheel (S110), and when the rotational acceleration $A_{S3}$ increases in the (−) direction, may determine that the tire pressure sensor $S_3$ is positioned in the inner wheel 301 and the tire pressure sensor $S_4$ is positioned in the outer wheel 302 (S111).

In step S104, when it is determined that the tire pressure sensors $S_1$ and $S_2$ are positioned in the right wheel RW and the tire pressure sensors $S_3$ and $S_4$ are positioned in the left wheel LW (S112), the tire pressure sensor location determining apparatus 100 determines an increasing or decreasing direction of the rotational acceleration $A_{S1}$ (S113). Accordingly, the tire pressure sensor location determining apparatus 100 may determine that the tire pressure sensor $S_1$ is positioned in the outer wheel 302 and the tire pressure sensor $S_2$ is positioned in the inner wheel 301 (S115) when the rotational acceleration $A_{S1}$ increases in the (+) direction. The tire pressure sensor location determining apparatus 100 may determine that the tire pressure sensor $S_1$ is positioned in the inner wheel 301, and the tire pressure sensor $S_2$ is positioned in the outer wheel 302 (S116) when the rotational acceleration $A_{S1}$ increases in the (−) direction.

On the other hand, the tire pressure sensor location determining apparatus 100 may determine an increasing or decreasing direction of the rotational acceleration $A_{S3}$ (S114), when the rotational acceleration $A_{S3}$ increases in the (+) direction. The tire pressure sensor location determining apparatus 100 may determine that the tire pressure sensor $S_3$ is positioned in the inner wheel and the tire pressure sensor $S_4$ is positioned in the outer wheel (S117), and when the rotational acceleration $A_{S3}$ increases in the (−) direction, may determine that the tire pressure sensor $S_3$ is positioned in the outer wheel 302 and the tire pressure sensor $S_4$ is positioned in the inner wheel 301 (S118).

As such, according to the present disclosure, when a total of four tire pressure sensors $S_1$, $S_2$, $S_3$, $S_4$ are respectively mounted in the left rear double wheel and right rear double wheel, it is possible to distinguish between left and right locations of the pair of rear double wheels equipped with four sensors by using tone heel of a wheel axle and a wheel pulse count value Cp measured by a wheel speed sensor. It is also possible to determine whether the corresponding sensor is positioned in the inner wheel 301 or the outer wheel 302 of the double-wheeled tire by using a sensor rotational acceleration value as explained above.

Therefore, according to the present disclosure, it is possible to accurately determine a location of a tire having a low pressure when a warning of insufficient air pressure is generated for a vehicle in which rear wheels are double-wheeled, such as a commercial vehicle, and to inform a driver of the accurate tire having low pressure. Thereafter, the specific tire having low pressure may be indicated on a display and/or interface device 130 (see FIG. 1) and the driver may know which tire to inflate and/or monitor.

Furthermore, according to the present disclosure, it is possible to implement a TPMS sensor auto-location function in a double-wheeled tire vehicle without an additional device by comparing wheel pulse counter values of wheel speed sensors 220 inputted when the tire pressure sensors 210 mounted on the respective double wheel sends a signal and by using rotational acceleration signals of the respective tire pressure sensors.

Figure 13:
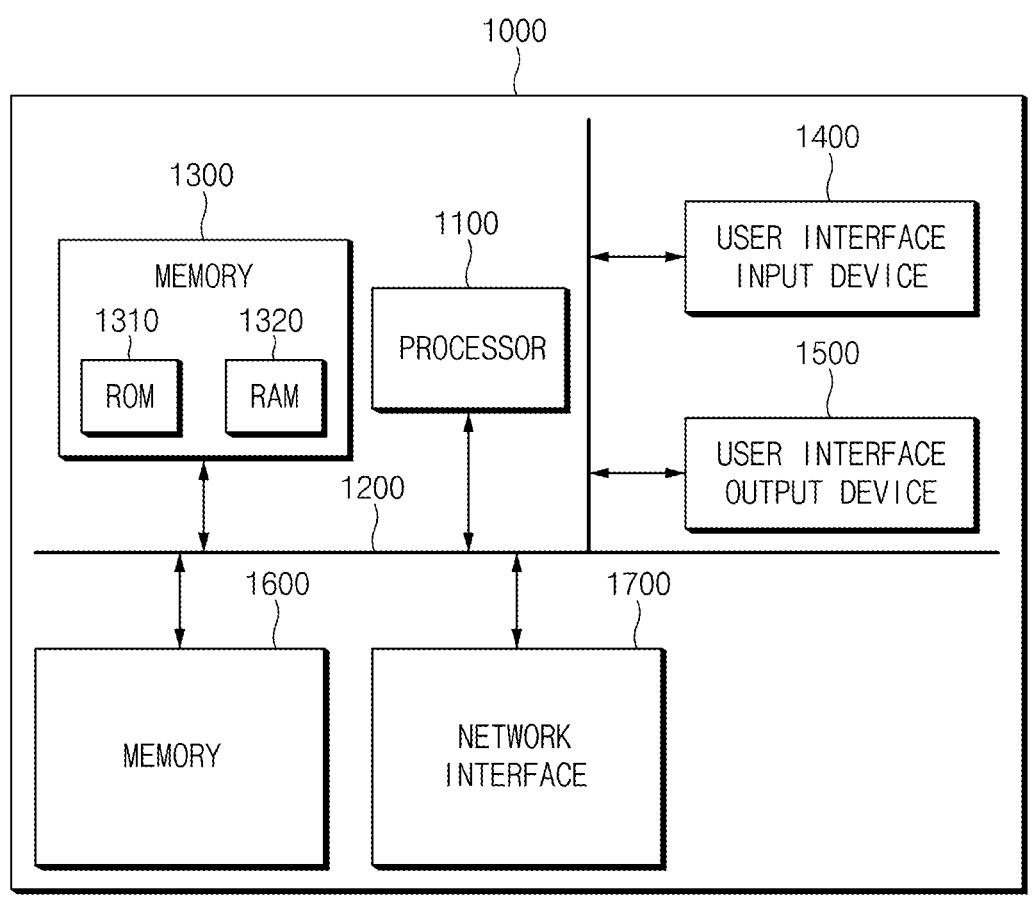
FIG. 13 illustrates a computing system according to an exemplary embodiment of the present disclosure.

FIG. 13 illustrates a computing system according to an exemplary embodiment of the present disclosure. Referring to FIG. 13, the computing system 1000 includes at least one processor 1100 connected through a bus 1200, a memory 1300, a user interface input device 1400, a user interface output device 1500, and a storage 1600, and a network interface 1700.

The processor 1100 may be a central processing unit (CPU) or a semiconductor device that performs processing on commands stored in the processing memory 1300 and/or the storage device 1600. The processing memory 1300 and the storage memory 1600 may include various types of volatile or nonvolatile storage media. For example, the processing memory 1300 may include a read only memory (ROM) and a random access memory (RAM). The storage memory may include any type of storage medium, e.g., a solid state storage device or the like.

Accordingly, steps of a method or algorithm described in connection with the exemplary embodiments disclosed herein may be directly implemented by hardware, a software module, or a combination of the two, and executed by the processor 1100. The software module may reside in a storage medium (i.e., the processing memory 1300 and/or the storage memory 1600) such as a RAM memory, a flash memory, a ROM memory, an EPROM memory, an EEPROM memory, a register, a hard disk, a removable disk, and/or a CD-ROM or DVD.

An exemplary storage medium 1600 may be in electrical communication and/or electrically coupled to the processor 1100, and the processor 1100 can read information from and write information to the storage medium 1600. Alternatively, the storage medium may be integrated with the processor 1100 as a combined unit. In some embodiments, the processor 1100 and the storage medium 1600 may reside within an application specific integrated circuit (ASIC). Additionally, the ASIC may reside within a user terminal. Alternatively, the processor 1100 and the storage medium 1600 may reside as separate components within the user terminal.

The above description is illustrative of the technical ideas and concepts of the present disclosure, and those skilled in the art to which the present disclosure pertains may make various modifications and variations without departing from the essential characteristics of the present disclosure.

Therefore, the exemplary embodiments disclosed in the present disclosure are not intended to limit the technical ideas of the present disclosure, but are set forth expressly to explain them. The scope of the technical ideas of the present disclosure is not limited by these exemplary embodiments. The legal protection afforded by the present disclosure should be interpreted solely by the plain and ordinary meaning of the claims below, with guidance taken from the exemplary embodiments and working examples explained hereinabove. Accordingly, all technical ideas within the equivalent range and scope of the claims shall be interpreted as being included in the scope of the present disclosure.

What is claimed is:

1. A vehicle system comprising:
a plurality of tire pressure sensors, each tire pressure sensor being configured to sense air pressure of a tire for use with a vehicle, the vehicle comprising a double wheel;
the plurality of tire pressure sensors including a first tire pressure sensor mounted in an inner wheel and a second tire pressure sensor mounted in an outer wheel of the double wheel;
a plurality of wheel speed sensors, each wheel speed sensor being configured to sense a speed of a corresponding wheel of the vehicle; and
a tire pressure sensor location determining apparatus configured to determine respective locations of the tire pressure sensors on the basis of wheel pulse counter values,
wherein the wheel pulse counter values are inputted from the wheel speed sensors whenever the tire pressure sensors transmit tire pressure detection signals, and
wherein, upon transmitting the tire pressure detection signals, a processor determines whether the wheel pulse counter values of the wheel speed sensors have constantly increasing values, so as to determine a location of the double wheel.

2. The vehicle system of claim 1, wherein:
the tire pressure sensor location determining apparatus further comprises:
a communication device configured to receive a wheel pulse counter value from the wheel speed sensor whenever a tire pressure detection signal is received from a tire pressure sensor mounted in a double-wheeled tire;
a storage configured to store the tire pressure detection signal and the wheel pulse counter value; and
the processor configured to: (1) determine whether each of the tire pressure sensors is mounted in a left wheel or a right wheel by using the wheel pulse counter value, and (2) to determine whether each of the tire pressure sensors is mounted in the inner wheel or the outer wheel of the double wheel by using rotational acceleration.

3. The vehicle system of claim 1, wherein:
the wheel pulse counter value is obtained by converting a wheel pulse signal that is outputted as a number of cogs of a tone wheel into a controller area network (CAN) signal.

4. The vehicle system of claim 2, wherein the plurality of tire pressure sensors further include:
a third tire pressure sensor and a fourth tire pressure sensor mounted in inner and outer wheels of another double wheel, respectively; and
a fifth tire pressure sensor and a sixth tire pressure sensor mounted in opposite front wheels.

5. The vehicle system of claim 1, wherein:
each of the tire pressure sensors is configured to transmit a respective tire pressure detection signal when a corresponding vehicle wheel reaches a predetermined position during rotation.

6. The vehicle system of claim 4, wherein:
the first tire pressure sensor and the second tire pressure sensor are configured to be mounted on respective tires at positions having a predetermined phase difference.

7. The vehicle system of claim 4, wherein:
the processor is further configured to compare a wheel pulse counter value for the first tire pressure sensor with a wheel pulse counter value for the second tire pressure sensor depending on a phase difference between the first tire pressure sensor and the second tire pressure sensor.

8. The vehicle system of claim 7, wherein:
as a result of comparing the wheel pulse counter value for the first tire pressure sensor and the wheel pulse counter value for the second tire pressure sensor,
the processor is further configured to determine the first tire pressure sensor and the second tire pressure sensor as a pair of tire pressure sensors respectively mounted in the inner wheel and the outer wheel of the double wheel when the difference is constant.

9. The vehicle system of claim 1, wherein:
the processor is further configured to determine whether the first tire pressure sensor is provided in the outer wheel or the inner wheel of the double wheel depending on an increasing or decreasing direction of rotational acceleration of each of the sensors by using rotational acceleration signals received from the first tire pressure sensor and the second tire pressure sensor.

10. The vehicle system of claim 4, wherein:
the first tire pressure sensor and the second tire pressure sensor are respectively mounted in opposite directions.

11. The vehicle system of claim 10, wherein:
when a vehicle wheel rotates, the rotational acceleration increases in a (+) direction when the first tire pressure sensor rotates clockwise, and
the rotational acceleration increases in a (−) direction when the second tire pressure sensor rotates counter-clockwise.

12. The vehicle system of claim 10, wherein:
the processor is further configured to determine that a tire pressure sensor whose rotational acceleration increases in the (+) direction is positioned in the inner wheel and a tire pressure sensor whose rotational acceleration increases in the (−) direction is positioned in the outer wheel is among a pair of tire pressure sensors determined to be positioned in the left wheel of the vehicle.

13. The vehicle system of claim 10, wherein:
the processor is further configured to determine (1) that a tire pressure sensor whose rotational acceleration increases in the (+) direction is positioned in the outer wheel and/or (2) a tire pressure sensor whose rotational acceleration increases in the (−) direction is positioned in the inner wheel is among a pair of tire pressure sensors determined to be positioned in the right wheel of the vehicle.

14. A method for determining a location of a tire pressure monitoring sensor, comprising:
receiving and storing, by a processor, signals from a plurality of tire pressure sensors and a plurality of wheel speed sensors, the plurality of tire pressure sensors including a first tire pressure sensor mounted in an inner wheel and a second tire pressure sensor mounted in an outer wheel of a double wheel;
determining, by the processor, respective locations of the tire pressure sensors using wheel pulse counter values inputted from the wheel speed sensors whenever the tire pressure sensors transmit tire pressure detection signals; and
upon transmitting the tire pressure detection signals, determining, by the processor, whether the wheel pulse counter values of the wheel speed sensors have constantly increasing values, so as to determine a location of the double wheel.

15. The determining method of claim 14, wherein determining the respective locations of the tire pressure sensors further includes:
determining, by the processor, whether each of the tire pressure sensors is mounted in a left wheel or a right wheel using the wheel pulse counter values; and
determining, by the processor, whether each of the tire pressure sensors is mounted in the inner wheel or the outer wheel of the double wheel using rotational acceleration values.

16. The determining method of claim 14, wherein determining whether each of the tire pressure sensors is mounted in the inner wheel or the outer wheel of the double wheel further includes:
determining, by the processor, whether each of the tire pressure sensors is mounted in the inner wheel or the outer wheel depending on an increasing or decreasing direction of rotational acceleration of each of the tire pressure sensors by using a rotational acceleration signal received from each of the tire pressure sensors.

17. The determining method of claim 16, wherein determining whether each of the tire pressure sensors is mounted in the inner wheel or the outer wheel of the double wheel further includes:
determining, by the processor, that a tire pressure sensor whose rotational acceleration increases in the (+) direction is positioned in the inner wheel and a tire pressure sensor whose rotational acceleration increases in the (−) direction is positioned in the outer wheel are among a pair of tire pressure sensors determined to be positioned in the left wheel of a vehicle; and
determining, by the processor, that a tire pressure sensor whose rotational acceleration increases in the (+) direction is positioned in the outer wheel and a tire pressure sensor whose rotational acceleration increases in the (−) direction is positioned in the inner wheel are among a pair of tire pressure sensors determined to be positioned in the right wheel of the vehicle.

* * * * *